United States Patent
Wakiguchi et al.

(10) Patent No.: US 12,327,108 B2
(45) Date of Patent: Jun. 10, 2025

(54) ELECTRONIC CONTROL APPARATUS, REPROGRAM EXECUTION METHOD, AND NON-TRANSITORY COMPUTER READABLE STORAGE MEDIUM

(71) Applicants: DENSO CORPORATION, Kariya (JP); TOYOTA JIDOSHA KABUSHIKI KAISHA, Toyota (JP)

(72) Inventors: Kotaro Wakiguchi, Kariya (JP); Yuto Hirashima, Kariya (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 132 days.

(21) Appl. No.: 18/299,737

(22) Filed: Apr. 13, 2023

(65) Prior Publication Data
US 2023/0333841 A1    Oct. 19, 2023

(30) Foreign Application Priority Data
Apr. 19, 2022 (JP) .................. 2022-068849

(51) Int. Cl.
G06F 8/71 (2018.01)
G06F 8/654 (2018.01)

(52) U.S. Cl.
CPC ............ *G06F 8/654* (2018.02); *G06F 8/71* (2013.01)

(58) Field of Classification Search
CPC ....................................................... G06F 8/71
USPC ....................................................... 717/168
See application file for complete search history.

(56) References Cited

U.S. PATENT DOCUMENTS

| | | | |
|---|---|---|---|
| 8,813,061 B2* | 8/2014 | Hoffman | G06F 8/65 717/172 |
| 9,116,786 B2* | 8/2015 | Ricci | H04L 12/6418 |
| 9,772,839 B2* | 9/2017 | Hong | H04L 67/34 |
| 10,274,919 B2* | 4/2019 | Fischer | B60R 16/0231 |
| 10,394,548 B2* | 8/2019 | Fox | G06F 21/577 |
| 10,489,141 B2* | 11/2019 | Nakamura | H04L 12/40 |
| 11,137,997 B2* | 10/2021 | Fox | G06F 21/577 |
| 11,960,877 B2* | 4/2024 | Ishikawa | H04L 67/34 |
| 2016/0266886 A1* | 9/2016 | Sarkar | H04W 4/50 |
| 2017/0329599 A1* | 11/2017 | Choi | A61B 6/563 |
| 2018/0074812 A1* | 3/2018 | Kawaguchi | G06F 8/654 |
| 2018/0107473 A1* | 4/2018 | Ahmed | G06F 8/654 |
| 2019/0034256 A1* | 1/2019 | Fox | G06F 12/0646 |
| 2019/0108010 A1* | 4/2019 | Tillman | H04L 67/12 |
| 2020/0050442 A1* | 2/2020 | Sakurai | H04W 4/48 |
| 2020/0174779 A1* | 6/2020 | David | G06F 8/654 |

(Continued)

FOREIGN PATENT DOCUMENTS

JP    2020-027629 A    2/2020

*Primary Examiner* — Francisco J Aponte
(74) *Attorney, Agent, or Firm* — Harness, Dickey & Pierce, P.L.C.

(57) ABSTRACT

A device identification information is received for identifying an electronic control device conforming to a predetermined platform as a reprogram target. A detailed information is held for a connection destination necessary for transmitting a processing request to the electronic control device as the reprogram target identified by the device identification information. The processing request is transmitted to the electronic control device conforming to the predetermined platform via a programming interface based on the detailed information.

8 Claims, 17 Drawing Sheets

(56) References Cited

U.S. PATENT DOCUMENTS

| | | | |
|---|---|---|---|
| 2020/0183676 A1* | 6/2020 | Sakurai | H04L 67/34 |
| 2020/0228478 A1* | 7/2020 | Ros | H04L 67/60 |
| 2020/0412756 A1* | 12/2020 | Kishikawa | H04L 63/126 |
| 2021/0155252 A1* | 5/2021 | Harata | G06F 8/65 |
| 2021/0157570 A1 | 5/2021 | Harata et al. | |
| 2021/0167988 A1* | 6/2021 | Harata | H04W 4/40 |
| 2021/0216294 A1* | 7/2021 | Jeon | H04L 12/40143 |
| 2021/0255805 A1* | 8/2021 | Harata | H04L 12/403 |
| 2021/0397444 A1* | 12/2021 | Fox | B60W 50/04 |
| 2021/0403016 A1* | 12/2021 | Jung | G06F 8/65 |
| 2022/0012043 A1* | 1/2022 | Sakurai | H04L 9/3239 |
| 2022/0024471 A1* | 1/2022 | Itatsu | G06F 11/30 |
| 2022/0036670 A1* | 2/2022 | Kobayashi | B60R 16/02 |
| 2022/0179641 A1* | 6/2022 | Harata | B60R 16/02 |
| 2022/0326931 A1* | 10/2022 | Choi | B60W 50/14 |
| 2022/0326933 A1* | 10/2022 | Jung | G06F 8/65 |
| 2022/0415097 A1* | 12/2022 | Kodama | G06F 13/00 |
| 2023/0095760 A1* | 3/2023 | Go | H04L 67/34 717/171 |
| 2023/0409316 A1* | 12/2023 | Aiba | B60R 16/02 |
| 2024/0211229 A1* | 6/2024 | Xiong | G06F 8/61 |

\* cited by examiner

FIG. 3

UCMID REF TABLE

| REPRO TAR ECUID | UCMID |
|---|---|
| ECU01 | UCM01 |
| ECU02 | UCM01 |
| ECU03 | UCM01 |
| ECU04 | UCM02 |

FIG. 4

CON DEST REF TABLE

| UCMID | CON DEST |
|---|---|
| UCM01 | Flashing Adapter |
| UCM02 | UCM |

FIG. 5

DETAIL INF REF TABLE

| ECUID | IP ADD | CANID | PORT |
|---|---|---|---|
| ECU01 | 192.168.x.x | — (NOT DESIGNATE IN CASE OF CP W/ ETHER NET CON) | 5000 |
| ECU02 | 192.168.x.x | YYY | 5001 |
| ECU03 | 192.168.x.x | ZZZ | 5002 | ant
ELECTRONIC CONTROL APPARATUS, REPROGRAM EXECUTION METHOD, AND NON-TRANSITORY COMPUTER READABLE STORAGE MEDIUM

CROSS REFERENCE TO RELATED APPLICATIONS

The present application claims the benefit of priority from Japanese Patent Application No. 2022-068849 filed on Apr. 19, 2022. The entire disclosure of the above application is incorporated herein by reference.

TECHNICAL FIELD

The present disclosure relates to an electronic control apparatus, a reprogram execution method, and a non-transitory computer readable storage medium.

BACKGROUND

For example, in an in-vehicle electronic control unit (hereinafter referred to as an ECU (Electronic Control Unit)), it is possible to reprogram an update program for the purpose of improving functions, repairing bugs, and the like. In this case, the master ECU that functions as an update master that manages the implementation of reprogramming executes the reprogramming by transmitting a processing request to the reprogramming target ECU that functions as the target of reprogramming.

SUMMARY

According to an example, a device identification information may be received for identifying an electronic control device conforming to a predetermined platform as a reprogram target. A detailed information may be held for a connection destination necessary for transmitting a processing request to the electronic control device as the reprogram target identified by the device identification information. The processing request may be transmitted to the electronic control device conforming to the predetermined platform via a programming interface based on the detailed information.

BRIEF DESCRIPTION OF THE DRAWINGS

The above and other objects, features and advantages of the present disclosure will become more apparent from the following detailed description made with reference to the accompanying drawings. In the drawings:

FIG. 3 is a diagram showing a UCMID reference table;

FIG. 4 is a diagram showing a connection destination reference table;

FIG. 5 is a diagram showing a detailed information reference table;

DETAILED DESCRIPTION

Figure 1:
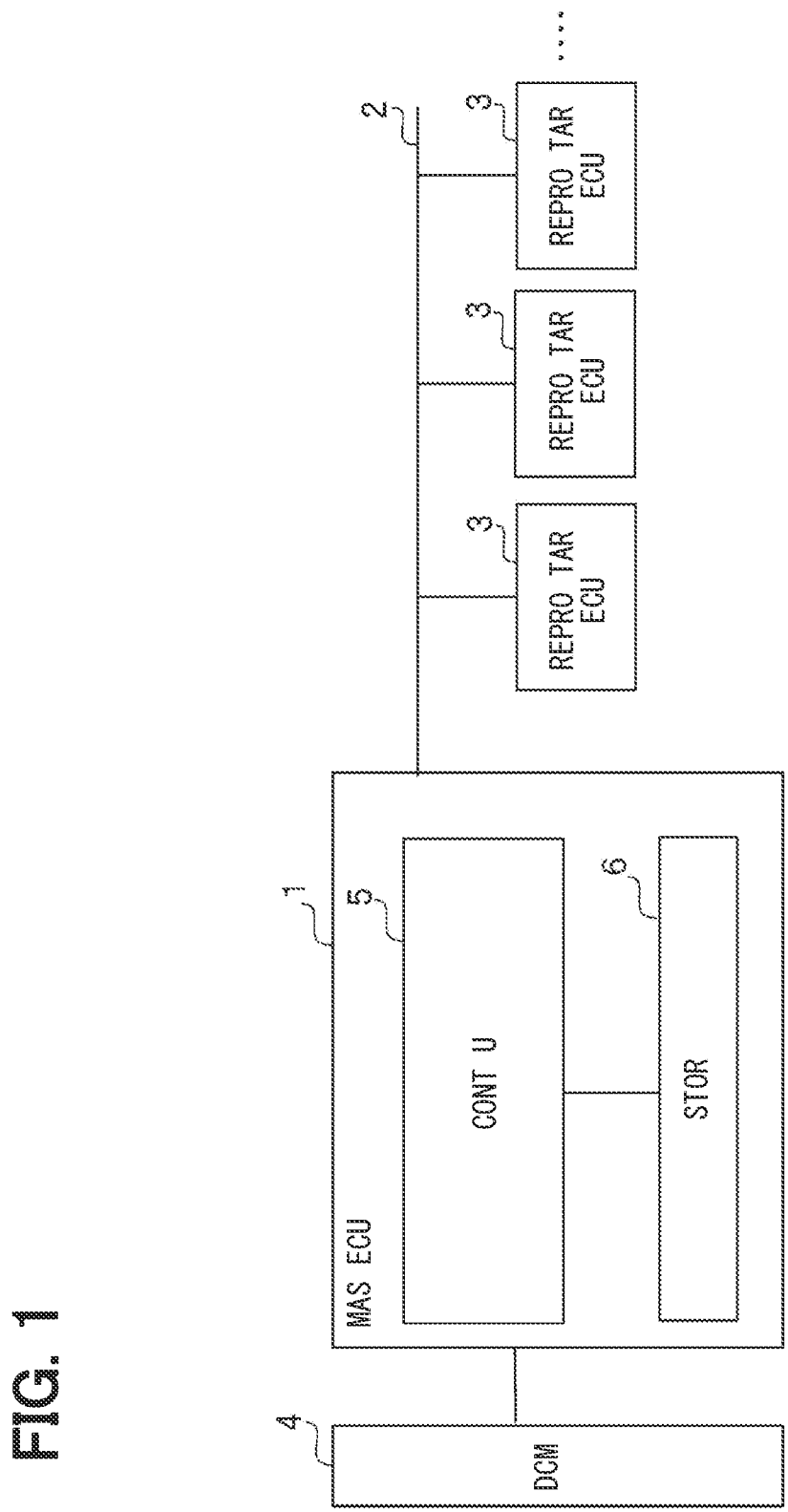
FIG. 1 is a functional block diagram showing an embodiment.

The master ECU includes a UCM (Update and Configuration Management) master, a flashing adapter, and a programming IF. According to the specifications of Autosar's (i.e., AUTOSAR's) Adaptive Platform (hereinafter referred to as AP, i.e., Adaptive Platform), the flashing adapter has an interface equivalent to that of the UCM. When the reprogram target ECU is an ECU conforming to the classic platform (hereinafter referred to as CP, i.e., Classic Platform), the flashing adapter receives an ECUID that can identify the CP conforming ECU from the UCM master, and receives a processing request from the UCS master. Since the detailed information on the connection destination is insufficient, the received processing request cannot be sent to the CP-conforming reprogram target ECU through the programming IF, so that the reprogramming cannot be performed.

The present embodiments have been made in view of the above circumstances, and the present embodiments provide an electronic control device, a reprogramming method, a non-transitory computer readable storage medium and a reprogramming program that can properly execute the reprogramming by appropriately transmitting a processing request to a reprogram target electronic control device conforming to the classic platform.

According to the embodiments, the UCM master transmits the device identification information that can identify the reprogram target electronic control device. A detailed information holding unit holds detailed information of a connection destination necessary for transmitting a processing request to the reprogram target electronic control device identified by the device identification information. When the flashing adapter receives from the UCM master the device identification information that can identify an electronic control device conforming to a predetermined platform as a reprogram target, it refers to the detailed information stored in the detailed information holding unit and transmits a processing request to the electronic control device conforming to the predetermined platform via a programming IF based on the detailed information.

When holding the detailed information of the connection destination necessary for transmitting the processing request to the reprogram target electronic control device, and receiving the device identification information that can identify the electronic control device conforming to the predetermined platform as the reprogram target from the UCM master, the detailed information is referred to, and based on the detailed information, the processing request is transmitted to the electronic control device conforming to the predetermined platform via a programming IF. As a result, when the electronic control device conforming to the predetermined platform as the reprogram target is an electronic control device conforming to the AUTOSAR Classic Platform, the processing request is appropriately transmitted to the reprogram target electronic control device conforming to the Classic Platform, so that the reprogramming can be performed appropriately.

Hereinafter, one embodiment will be described with reference to the drawings. As shown in FIG. 1, the master ECU 1 mounted in the vehicle functions as an update master that manages the execution of reprogramming for the purpose of improving functions, repairing defects, and the like. The master ECU 1 is connected to a plurality of ECUs via an in-vehicle network 2 so as to enable data communication, and the master ECU 1 integrally manages the plurality of ECUs by instructing an operation instruction to the plurality of ECUs, acquiring an operation state of the plurality of ECUs and the like. The in-vehicle network 2 is, for example, CAN (Controller Area Network, registered trademark), Ethernet (registered trademark), LIN, CXPI (Clock Extension Peripheral Interface, registered trademark), FLEXRAY (registered trademark), MOST (Media Oriented Systems Transport, registered trademark), or the like. The master ECU 1 identifies a reprogramming target ECU 3 that functions as a reprogramming target from among the plurality of ECUs, and executes reprogramming by instructing the reprogramming target ECU 3 to write an update program therein.

The master ECU 1 is connected to a DCM (Data Communication Module) 4 functioning as a data communication device. The DCM 4 is wirelessly connected to an OTA center via a communication network so that a distribution package transmitted from the OTA center can be received. When receiving the distribution package transmitted from the OTA center, the DCM 4 transmits the received distribution package to the master ECU 1. When the delivery package is transferred from the DCM 4, the master ECU 1 extracts the update program from the transferred delivery package and instructs the reprogram target ECU 3 to write the extracted update program, thereby executing the reprogramming.

Also, the master ECU 1 can transfer a distribution package from a reprogramming tool (not shown) by wire connection with the reprogramming tool. When the delivery package is transferred from the reprogramming tool, the master ECU 1 extracts the update program from the transferred delivery package and instructs the reprogram target ECU 3 to write the extracted update program, thereby executing the reprogramming.

The master ECU 1 includes a control unit 5 and a storage 6. The control unit 5 is provided by a microcomputer having a CPU (Central Process Unit), a ROM (Read Only Memory), a RAM (Random Access Memory), and an I-O (Input-Output). By executing a control program stored in a non-transitory tangible storage medium, the control unit 5 executes a process corresponding to the control program, and controls the overall operation of the master ECU 1. The control program executed by the control unit 5 includes a reprogram execution program.

The storage 6 is a nonvolatile memory mainly including, for example, a NOR flash memory or a NAND flash memory, and is shared by multiple applications executed by the control unit 5. That is, a plurality of applications each access the storage 6 to write and read data. Although the configuration in which the storage 6 is built in the master ECU 1 is exemplified in this embodiment, it may be also possible to apply a configuration in which the storage 6 is arranged outside the master ECU 1. Further, although the configuration in which the storage 6 is shared by a plurality of applications executed by the control unit 5 is illustrated, the application executed by the control unit of another ECU connected to the master ECU 1 for data communication may share the storage 6.

Figure 2:
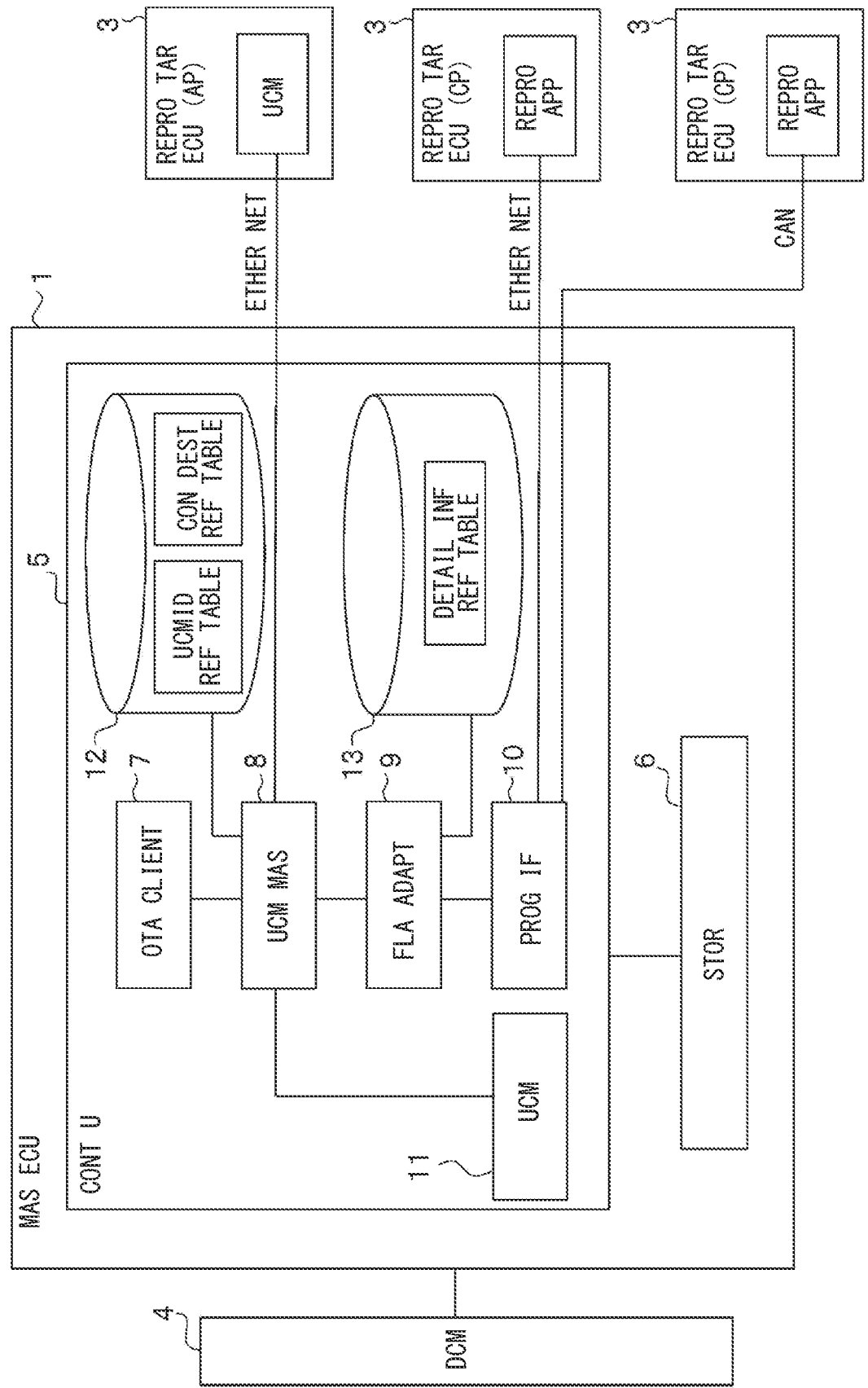
FIG. 2 is a diagram showing the internal configuration of a control unit.

As shown in FIG. 2, the control unit 5 includes an OTA client 7, a UCM master 8, a flashing adapter 9, a programming IF 10, and a UCM 11. The UCM master 8 holds a first table memory unit 12. The first table memory unit 12 stores the UCMID reference table shown in FIG. 3 and the connection destination reference table shown in FIG. 4. The UCMID reference table is a table in which an ECUID (i.e., ECU identification information) capable of identifying a reprogram target ECU is associated with a UCMID capable of identifying a UCM. The connection destination reference table is a table in which UCMIDs and connection destinations are associated with each other.

When the UCM master 8 acquires the ECUID of the reprogram target ECU, the UCM master 8 refers to the UCMID reference table to acquire the UCMID corresponding to the acquired ECUID, and refers to the connection destination reference table to determine the connection destination corresponding to the acquired UCMID. For example, when the UCM master 8 acquires "ECU01" as the ECUID, it refers to the UCMID reference table to acquire "UCM01" as the UCMID, and refers to the connection destination reference table to acquire the flashing adapter 9 as the connection destination. For example, when the UCM master 8 acquires "ECU04" as the ECUID, it refers to the UCMID reference table to acquire "UCM02" as the UCMID, and refers to the connection destination reference table to determine the UCM as the connection destination.

The flashing adapter 9 holds a second table memory unit 13 as a detailed information holding unit. The second table memory unit 13 stores the detailed information reference table shown in FIG. 5. The detailed information reference table is a table in which ECUIDs, IP addresses, CANIDs, and ports are associated with each other.

When acquiring the ECUID of the reprogram target ECU, the flashing adapter 9 refers to the detailed information reference table and acquires the IP address, the CANID, and the port as the detailed information of the corresponding reprogram target ECU based on the acquired ECUID. When the flashing adapter 9 acquires, for example, "ECU01" as an ECUID, and the ECU to which the ECUID is assigned is connected via Ethernet, the flashing adapter 9 acquires "192.168.xx" as an IP address and "5000" as the port. When the flashing adapter 9 acquires, for example, "ECU02" as an ECUID, and the ECU to which the ECUID is assigned is connected via CAN, the flashing adapter 9 acquires "192.168.xx" as an IP address and "YYY" as the CANID, and "5001" as the port. The flashing adapter 9 obtains the ECUID from the UCM master 8 and uses the detailed information reference table to supplement the information necessary for instructing the programming IF 10.

The programming IF 10 is, for example, a programming interface for accessing a vehicle communication interface complying with a predetermined standard. The predetermined standard is, for example, ISO 22900-2. The UCM 11 performs the reprogramming conforming to the AP.

The AUTOSAR defines the standards for in-vehicle software platforms. The AUTOSAR defines the AUTOSAR Classic Platform, which adopts a static operating system, and the AUTOSAR Adaptive Platform, which adopts a dynamic operating system. Therefore, the ECUs mounted on the vehicle include an ECU conforming to the adaptive platform (also referred to as an AP-compliant ECU) and an ECU conforming to the classic platform (also referred to as a CP-compliant ECU). Here, the ECU mounted on the vehicle may also include an ECU conforming to another platform.

In the reprogramming process, the UCM master 8 instructs the UCM 11 when the reprogram target ECU is an AP-compliant ECU, and instructs the flashing adapter 9 when the reprogram target ECU is a CP-compliant ECU. The UCM master 8 does not change the format of the instruction depending on whether the instruction destination is the UCM 11 or the flashing adapter 9, and transmits the instruction in the same format. The Flashing adapter 9 has an interface equivalent to the UCM 11.

The following will describe an operation of the above configuration with reference to FIG. 6 to FIG. 21. Here, a connection process, a version information acquisition process, an installation process, an activation process, and a table update process will be described.

Figure 6:
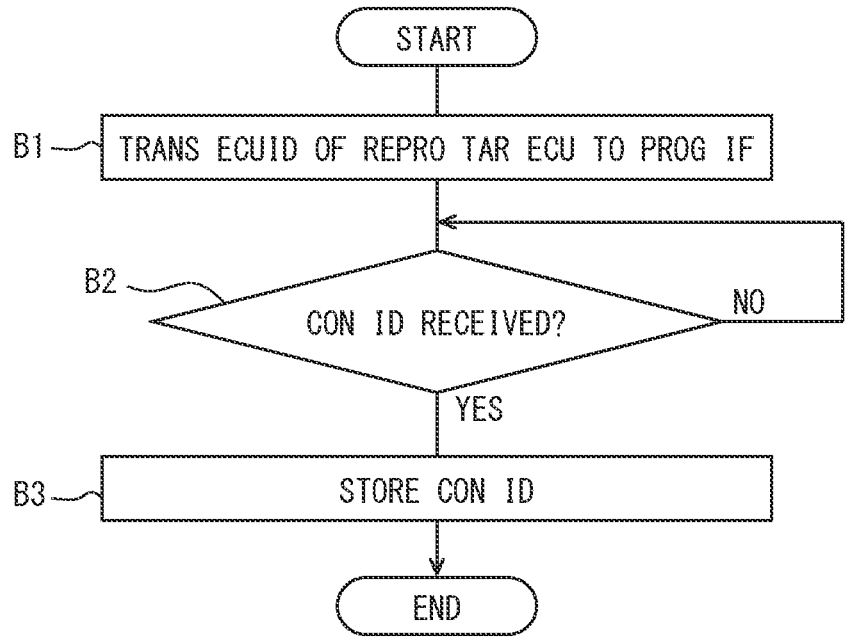
FIG. 6 is a flowchart showing a connection process of a flashing adapter.
Figure 7:
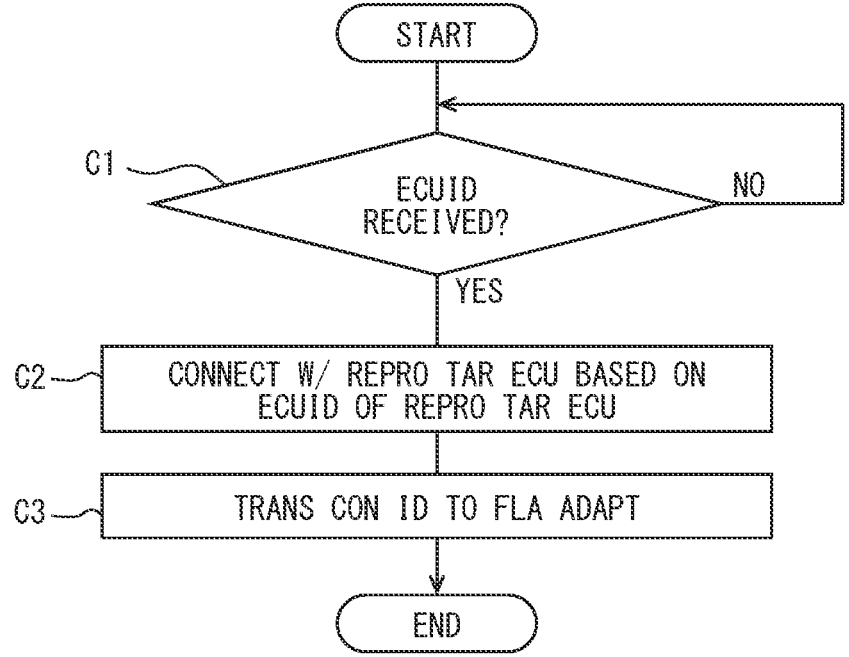
FIG. 7 is a flowchart showing a connection process of the programming IF.

(1) Connection Process (See FIGS. 6 and 7)

(1-1) Connection Process of a Flashing Adapter 9 (See FIG. 6)

When the connection process is started, the flashing adapter 9 transmits the ECUID of the ECU as the reprogram target to the programming IF 10 (at B1), and waits for reception of the connection ID from the programming IF 10 (at B2). When the flashing adapter 9 determines that it has received the connection ID transmitted from the programming IF 10 ("YES" at B2), the flashing adapter 9 stores the received connection ID (at B3) and terminates the connection process. The detailed information includes, for example, the ECUID, the IP address, the port number, and also further includes the CANID in the case of CAN connection. In the following embodiment, when the ECUID is transmitted from the flashing adapter 9 to the programming IF 10, in addition to the ECUID, the IP address and the port number are transmitted, and in the case of CAN connection, the CAN ID is also transmitted.

(1-2) Connection Process of a Programming IF 10 (See FIG. 7)

After starting the connection process, the programming IF 10 waits for reception of the ECUID of the ECU as the reprogram target from the flashing adapter 9 (at C1). When the programming interface 10 determines that it has received the ECUID of the ECU as the reprogram target transmitted from the flashing adapter 9 ("YES" at C1), the programming IF 10 identifies the ECU as the reprogram target and the connection destination based on the received ECUID of the ECU as the reprogram target, and connects to the ECU as the reprogram target identified as the connection destination (at C2). The programming IF 10 transmits the connection ID to the flashing adapter 9 (at C3) and terminates the connection process.

(2) Version Information Acquisition Process (See FIGS. 8 to 11)

Figure 8:
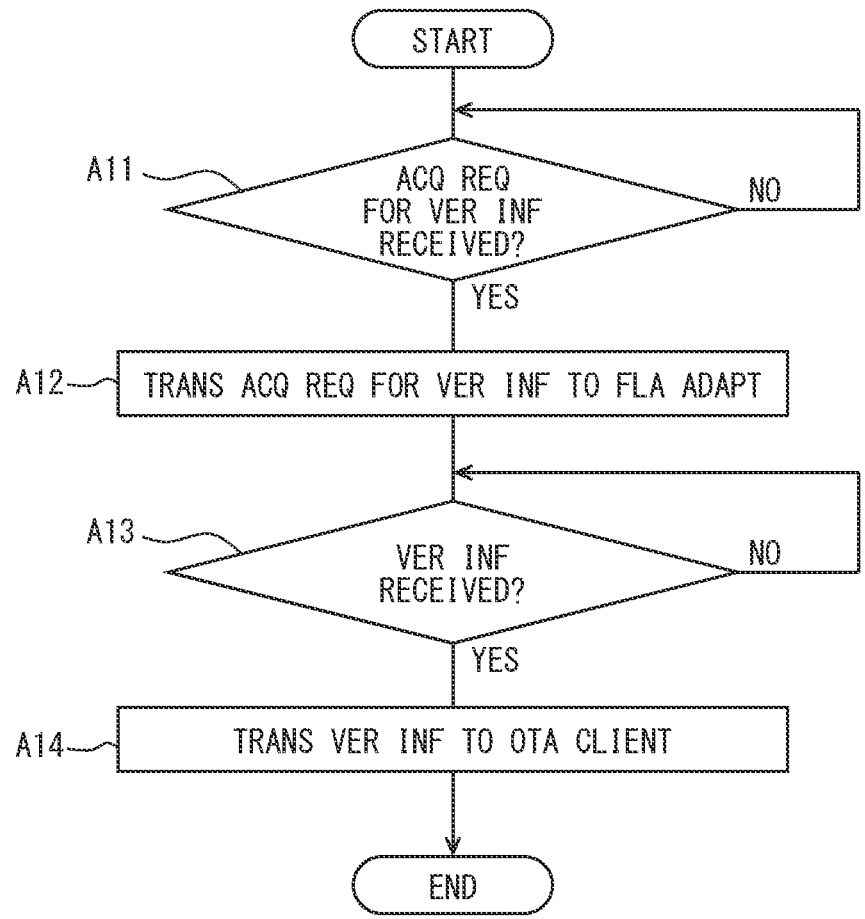
FIG. 8 is a flowchart showing a version information acquisition process of the UCM master.

(2-1) Version Information Acquisition Process of a UCM Master 8 (See FIG. 8)

After starting the version information acquisition process, the UCM master 8 waits for a version information acquisition request from the OTA client 7 (at A11). When the UCM master 8 determines that it has received the version information acquisition request transmitted from the OTA client 7 ("YES" at A11), the UCM master 8 transmits the version information acquisition request to the flashing adapter 9 (at A12), and waits for the reception of the version information from the flashing adapter 9. (at A13). When the UCM master 8 determines that it has received the version information transmitted from the flashing adapter 9 ("YES" at A13), the UCM master 8 transmits the received version information to the OTA client 7 (at A14), and ends the version information acquisition process. In this embodiment, only the CP-compliant ECU will be described. When there is an AP-compliant ECU, the UCM master 8 transmits an equivalent version information acquisition request to the UCM 11 and receives the version information from the UCM 11.

Figure 9:
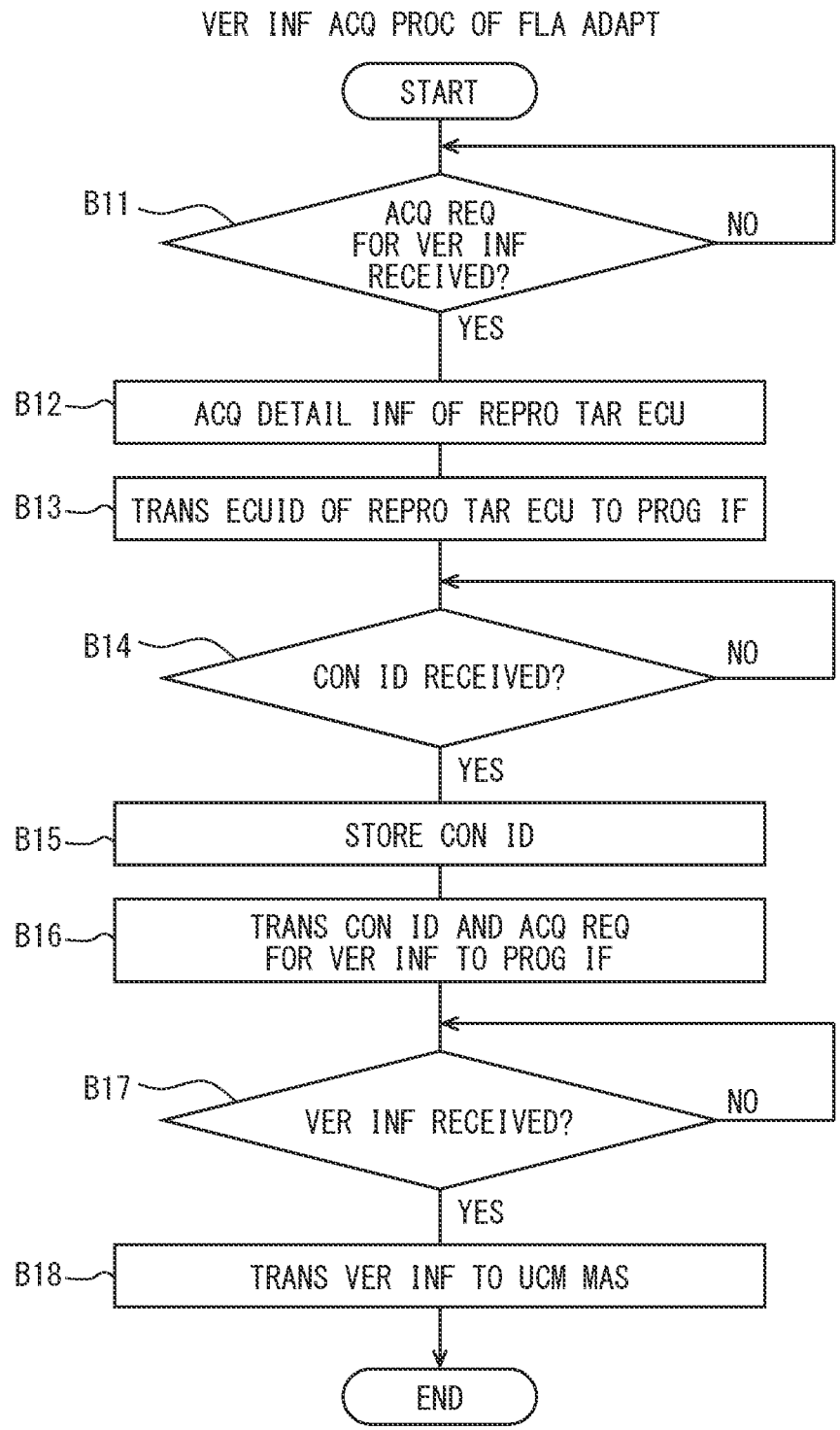
FIG. 9 is a flowchart showing a version information acquisition process of a flashing adapter.

(2-2) Version Information Acquisition Process of a Flashing Adapter 9 (See FIG. 9)

After starting the version information acquisition process, the flashing adapter 9 waits for the reception of a version information acquisition request from the UCM master 8 (at B11). When the flashing adapter 9 determines that it has received the version information acquisition request transmitted from the UCM master 8 ("YES" at B11), the flashing adapter 9 refers to the detailed information reference table based on the ECUID of the reprogram target ECU, and obtains the detailed information of the reprogram target ECU (at B12, corresponding to the detailed information reference procedure).

When the flashing adapter 9 acquires the detailed information of the reprogram target ECU, it performs the connection process described above. The flashing adapter 9 transmits the ECUID of the ECU as the reprogram target to the programming IF 10 (at B13), and waits for reception of the connection ID from the programming IF 10 (at B14). When the flashing adapter 9 determines that it has received the connection ID transmitted from the programming IF 10 ("YES" at B14, corresponding to the device identification information reception procedure), the flashing adapter 9 stores the received connection ID (at B15).

The flashing adapter 9 transmits the connection ID and the version information acquisition request to the programming IF 10 (at B16, corresponding to a process request transmission procedure), and waits for reception of the version information from the programming IF 10 (at B17). When the flashing adapter 9 determines that it has received the version information transmitted from the programming IF 10 ("YES" at B17, the flashing adapter 9 transmits the received version information to the UCM master 8 (at B18), and ends the version information acquisition process. Here, when the flashing adapter 9 has completed the connection process with the programming IF 10 and holds the connection ID, steps B12 to B15 may be skipped. Further, when the flashing adapter 9 requests the version information from a plurality of ECUs, the flashing adapter 9 transmits the version information to the UCM master 8 after receiving the version information from all the ECUs. In that case, the response to the UCM master 8 is only once.

Figure 10:
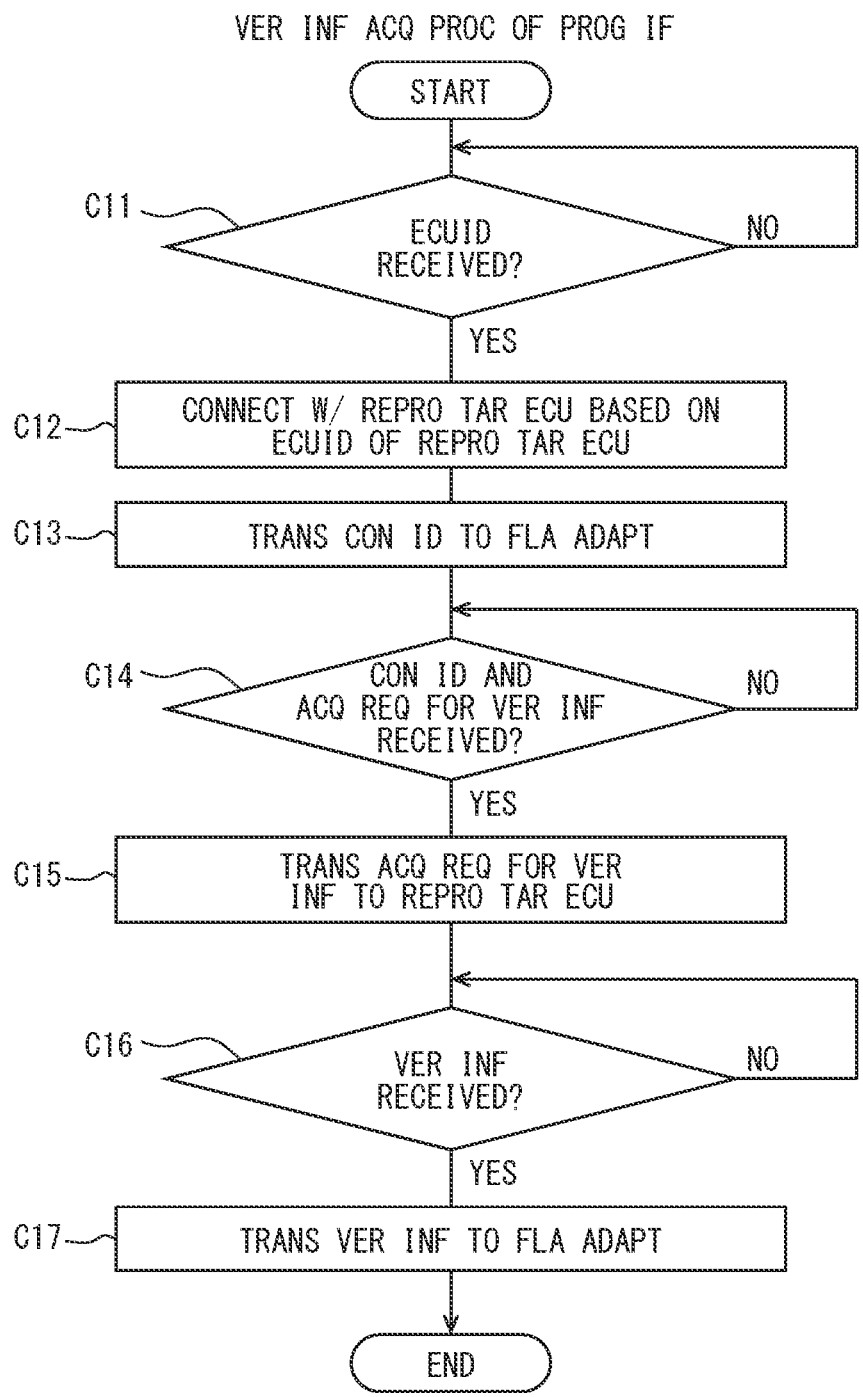
FIG. 10 is a flowchart showing a version information acquisition process of a programming IF.

(2-3) Version Information Acquisition Process of a Programming IF 10 (See FIG. 10)

When the programming IF 10 starts the version information acquisition process, the programming IF 10 performs the connection process described above. That is, the programming IF 10 waits for reception of the ECUID of the reprogram target ECU from the flashing adapter 9 (at C11). When the programming interface 10 determines that it has received the ECUID of the ECU as the reprogram target transmitted from the flashing adapter 9 ("YES" at C11), the programming IF 10 identifies the ECU as the reprogram target and the connection destination based on the received ECUID of the ECU as the reprogram target, and connects to the ECU as the reprogram target identified as the connection destination (at C12).

The programming IF 10 transmits the connection ID to the flashing adapter 9 (at C13), and waits for reception of the connection ID and the version information acquisition request from the flashing adapter 9 (at C14). When the programming IF 10 determines that it has received the connection ID and the version information acquisition request transmitted from the flashing adapter 9 ("YES" at C14), the programming IF 10 transmits the version information acquisition request to the reprogram target ECU based on the ECUID corresponding to the received connection ID (at C15), and waits for reception of the version information from the reprogram target ECU (at C16).

In this case, the reprogram target ECU transmits the version information to the programming IF 10 upon receiving the version information acquisition request transmitted from the programming IF 10. When the programming IF 10 determines that it has received the version information transmitted from the reprogram target ECU ("YES" at C16), the programming IF 10 transmits the received version information to the flashing adapter 9 (at C17), and ends the version information acquisition process.

Figure 11:
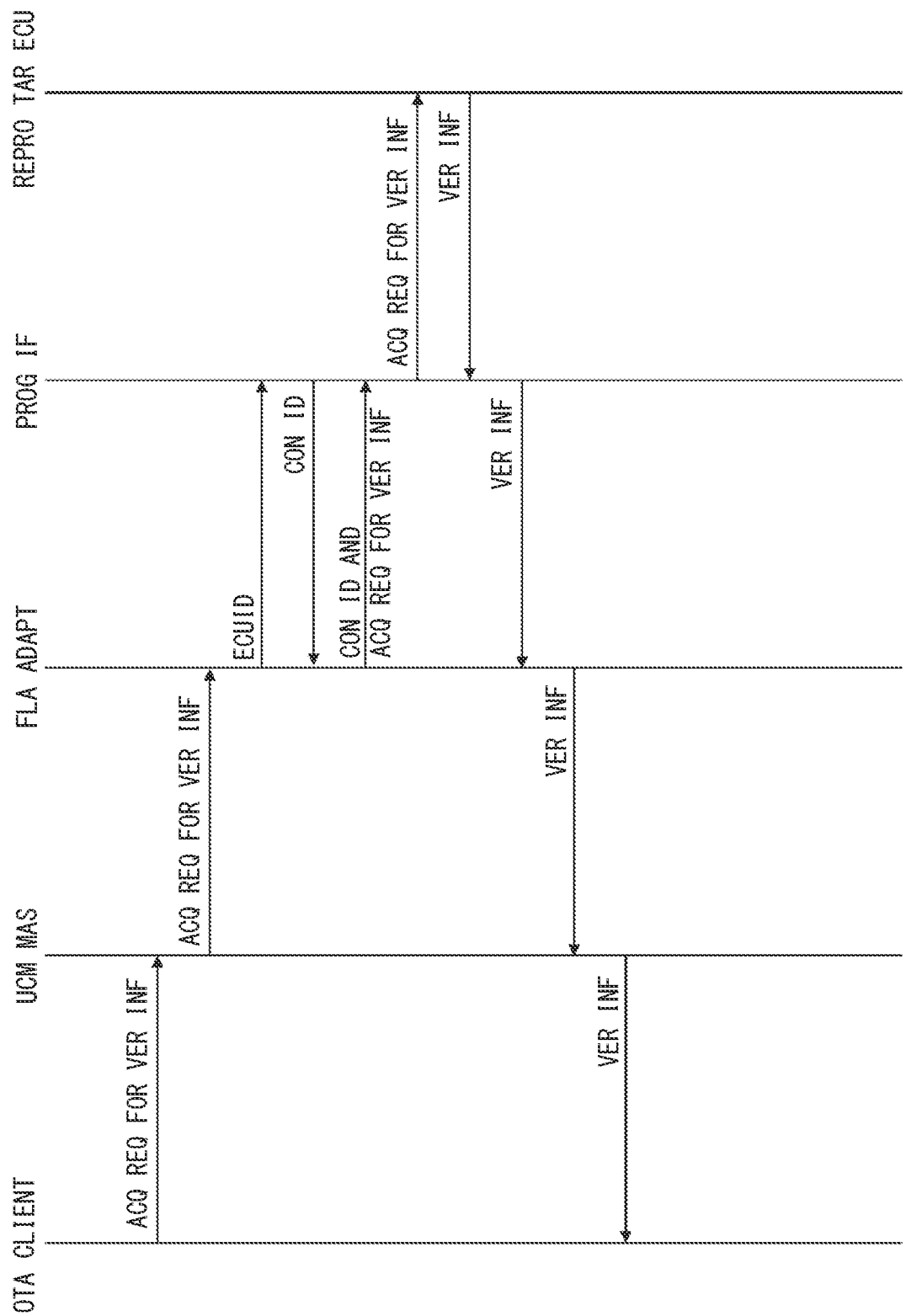
FIG. 11 is a diagram showing the flow of the process when acquiring the version information.

As described above, the control unit 5 performs the flow of processing shown in FIG. 11 when acquiring the version information.

(3) Installation Process (See FIGS. 12 to 15)

Figure 12:
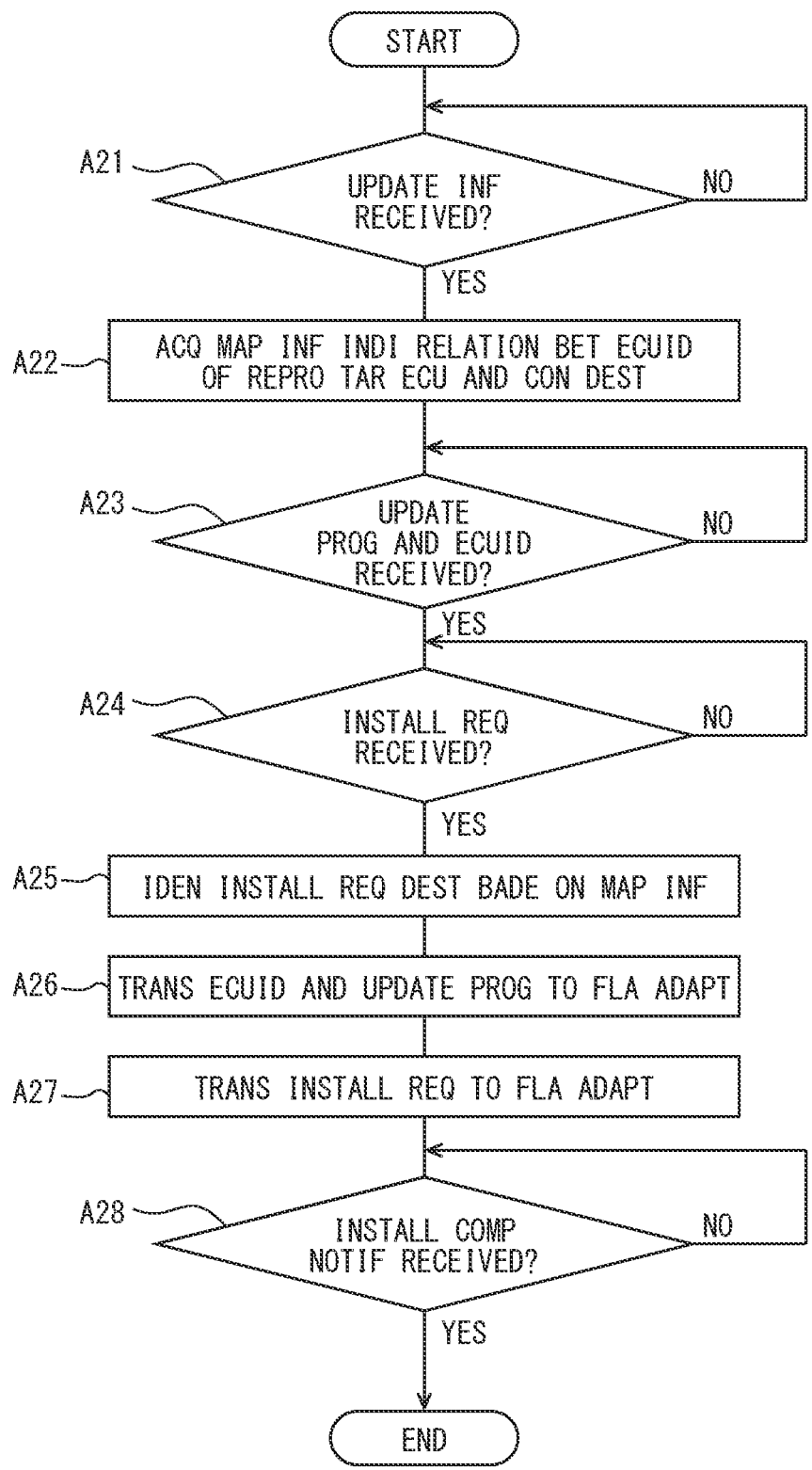
FIG. 12 is a flowchart showing an installation process of the UCM master.

(3-1) Installation Process of a UCM Master 8 (See FIG. 12)

After starting the installation process, the UCM master 8 waits to receive the update information from the OTA client 7 (at A21). When the UCM master 8 determines that it has received the update information transmitted from the OTA client 7 ("YES" at A21), the UCM mater 8 refers to the UCMID reference table and the connection destination reference table to obtain the mapping information indicating the relationship between the ECUID of the reprogram target ECU and the connection destination (at A22), and waits for reception of the ECUID of the reprogram target ECU and the update program from the OTA client 7 (at A23).

When the UCM master 8 determines that it has received the ECUID of the reprogram target ECU and the update program transmitted from the OTA client 7 ("YES" at A23), the UCM master 8 waits to receive an installation request from the OTA client 7 (at A24). When the UCM master 8 determines that it has received the installation request transmitted from the OTA client 7 ("YES" at A24), the UCM master 8 identifies the installation request destination based on the mapping information (at A25).

The UCM master 8 transmits the ECUID of the reprogram target ECU and the update program to the flashing adapter 9 (at A26), transmits an installation request to the flashing adapter 9 (at A27), and waits for reception of an installation completion notification from the flashing adapter 9 (at A28). When the UCM master 8 determines that it has received the installation completion notification transmitted from the flashing adapter 9 ("YES" at A28), the UCM master 8 ends the installation process. Here, when the reprogram target ECU includes an AP-compliant ECU, the UCM master 8 further transmits the ECUID of the reprogram target ECU and the update program to the UCM 11 at step A26, and further transmits an installation request to the UCM 11 at step A27.

Figure 13:
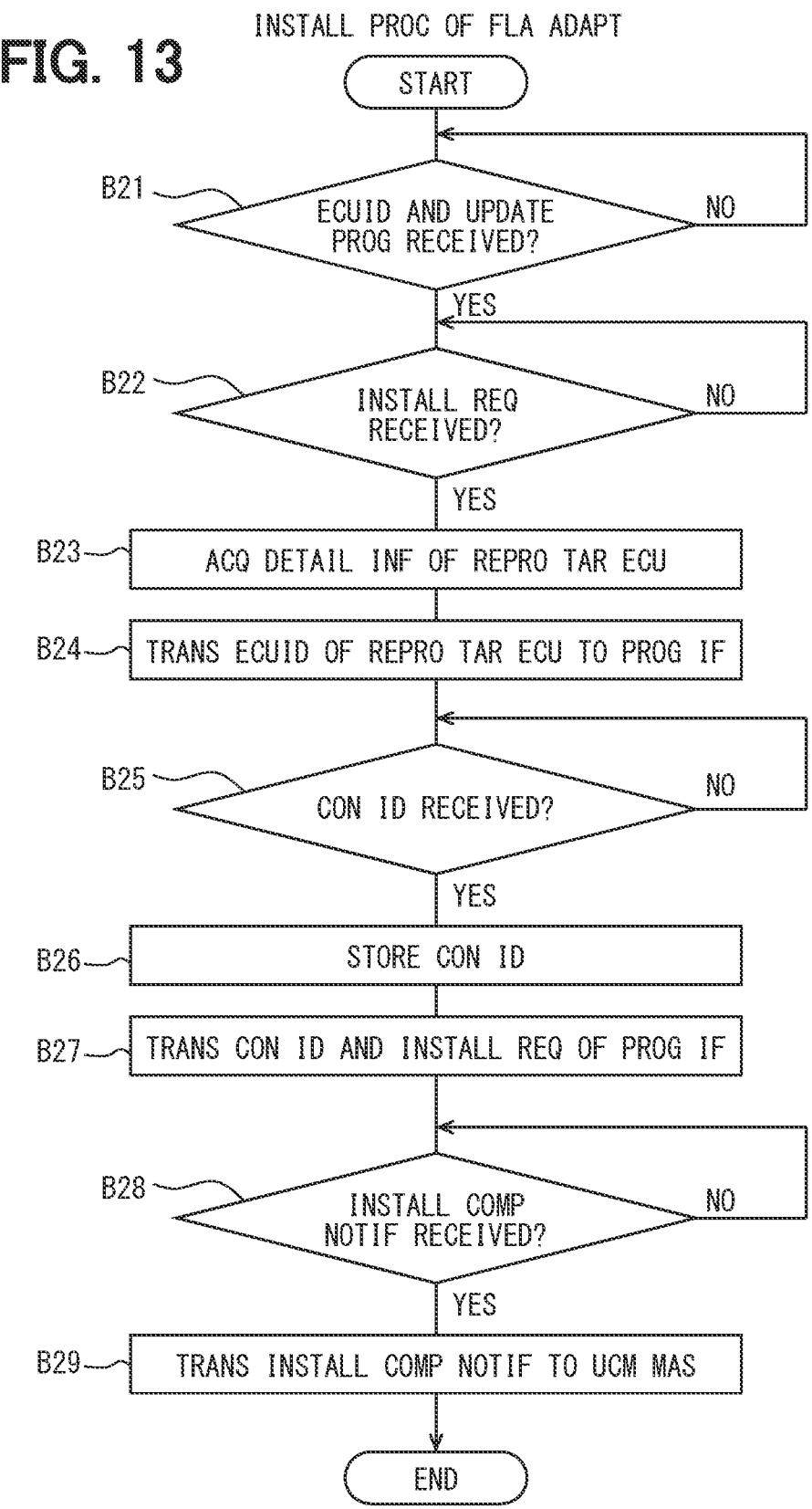
FIG. 13 is a flowchart showing an installation process of the flashing adapter.

(3-2) Installation Process of a Flashing Adapter 9 (See FIG. 13)

When the installation process is started, the flashing adapter 9 waits for reception of the ECUID of the reprogram target ECU and the update program from the UCM master 8 (at B21). When the flashing adapter 9 determines that it has received the ECUID of the reprogram target ECU and the update program transmitted from the UCM master 8 ("YES" at B21), the flashing adapter 9 waits for reception of an installation request from the UCM master 8 (at B22). When the flashing adapter 9 determines that it has received the installation request transmitted from the UCM master 8 ("YES" at B22), the flashing adapter 9 refers to the detailed information reference table based on the ECUID of the reprogram target ECU, and obtains the detailed information of the reprogram target ECU (at B23, corresponding to the detailed information reference procedure).

When the flashing adapter 9 acquires the detailed information of the reprogram target ECU, it performs the connection process described above. The flashing adapter 9 transmits the ECUID of the ECU as the reprogram target to the programming IF 10 (at B24), and waits for reception of the connection ID from the programming IF 10 (at B25). When the flashing adapter 9 determines that it has received the connection ID transmitted from the programming IF 10 ("YES" at B25, corresponding to the device identification information reception procedure), the flashing adapter 9 stores the received connection ID (at B26). Here, when the flashing adapter 9 already holds the connection ID, steps B23 to B26 may be skipped.

The flashing adapter 9 transmits the connection ID and the installation request to the programming IF 10 (at B27, corresponding to a process request transmission procedure), and waits for reception of the installation completion notification from the programming IF 10 (at B28). When the flashing adapter 9 determines that it has received the installation completion notification transmitted from the programming IF 10 ("YES" at B28), the flashing adapter 9 transmits the received installation completion notification to the UCM master 8 (at B29) and ends the installation process.

Figure 14:
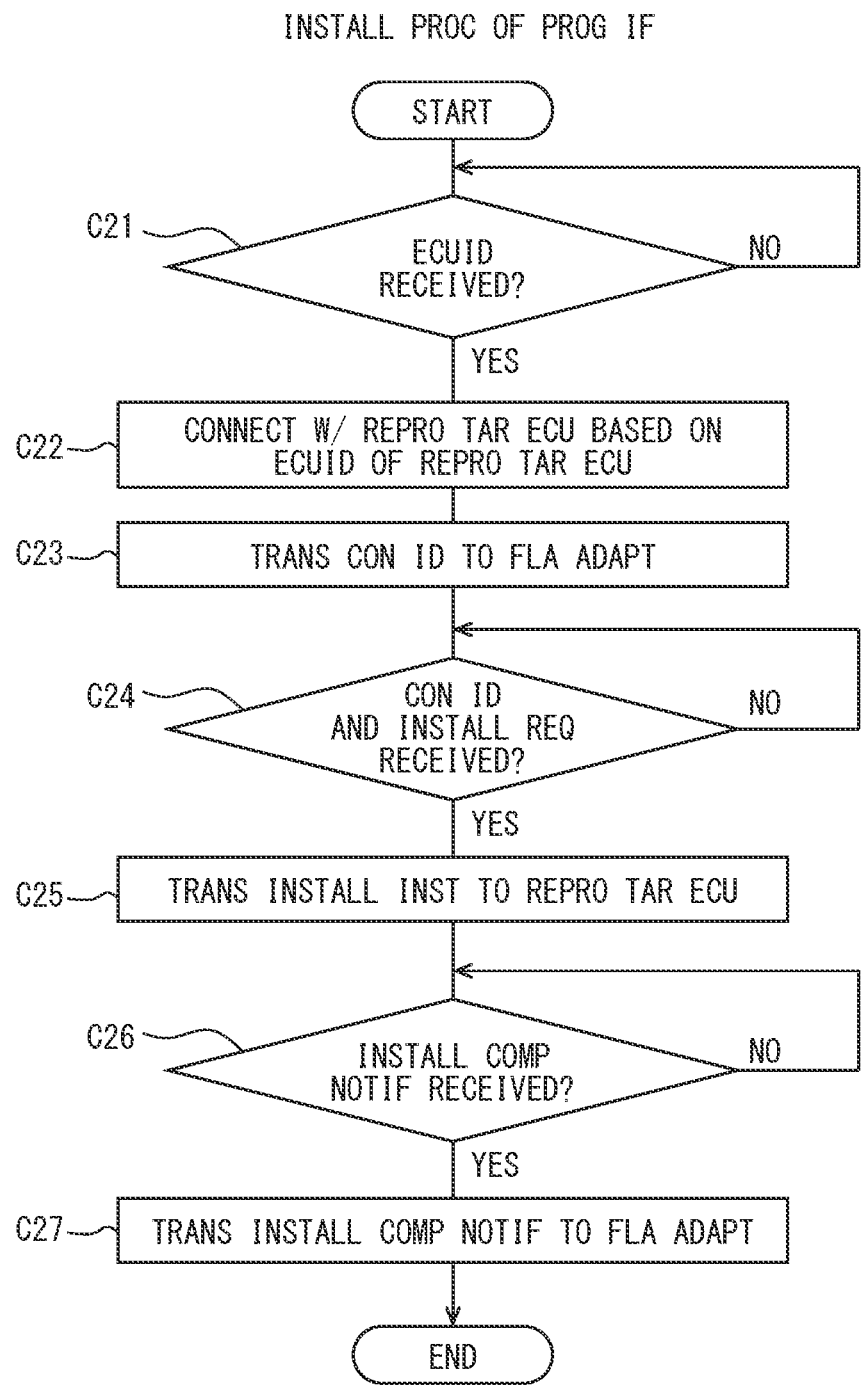
FIG. 14 is a flowchart showing an installation process of the programming IF.

(3-3) Installation Process of a Programming IF 10 (See FIG. 14)

When the programming IF 10 starts the installation process, the programming IF 10 performs the connection process described above. That is, the programming IF 10 waits for reception of the ECUID of the reprogram target ECU from the flashing adapter 9 (at C21). When the programming interface 10 determines that it has received the ECUID of the ECU as the reprogram target transmitted from the flashing adapter 9 ("YES" at C21), the programming IF 10 identifies the ECU as the reprogram target and the connection destination based on the received ECUID of the ECU as the reprogram target, and connects to the ECU as the reprogram target identified as the connection destination (at C22).

The programming IF 10 transmits the connection ID to the flashing adapter 9 (at C23), and waits for reception of the connection ID and the installation request from the flashing adapter 9 (at C24). When the programming IF 10 determines that it has received the connection ID and the installation request transmitted from the flashing adapter 9 ("YES" at C24), the programming IF 10 transmits an installation instruction to the reprogram target ECU based on the ECUID corresponding to the received connection ID (at C25), and waits for reception of an installation completion notification from the reprogram target ECU (at C26).

In this case, when the reprogram target ECU receives the installation instruction transmitted from the programming IF 10, the reprogram target ECU installs the update program, and upon completion of the installation of the update program, transmits an installation completion notification to the programming IF 10. When the programming IF 10 determines that it has received the installation completion notification transmitted from the reprogram target ECU ("YES" at C26), the programming IF 10 transmits the received installation completion notification to the flashing adapter 9 (at C27) and ends the installation process.

Figure 15:
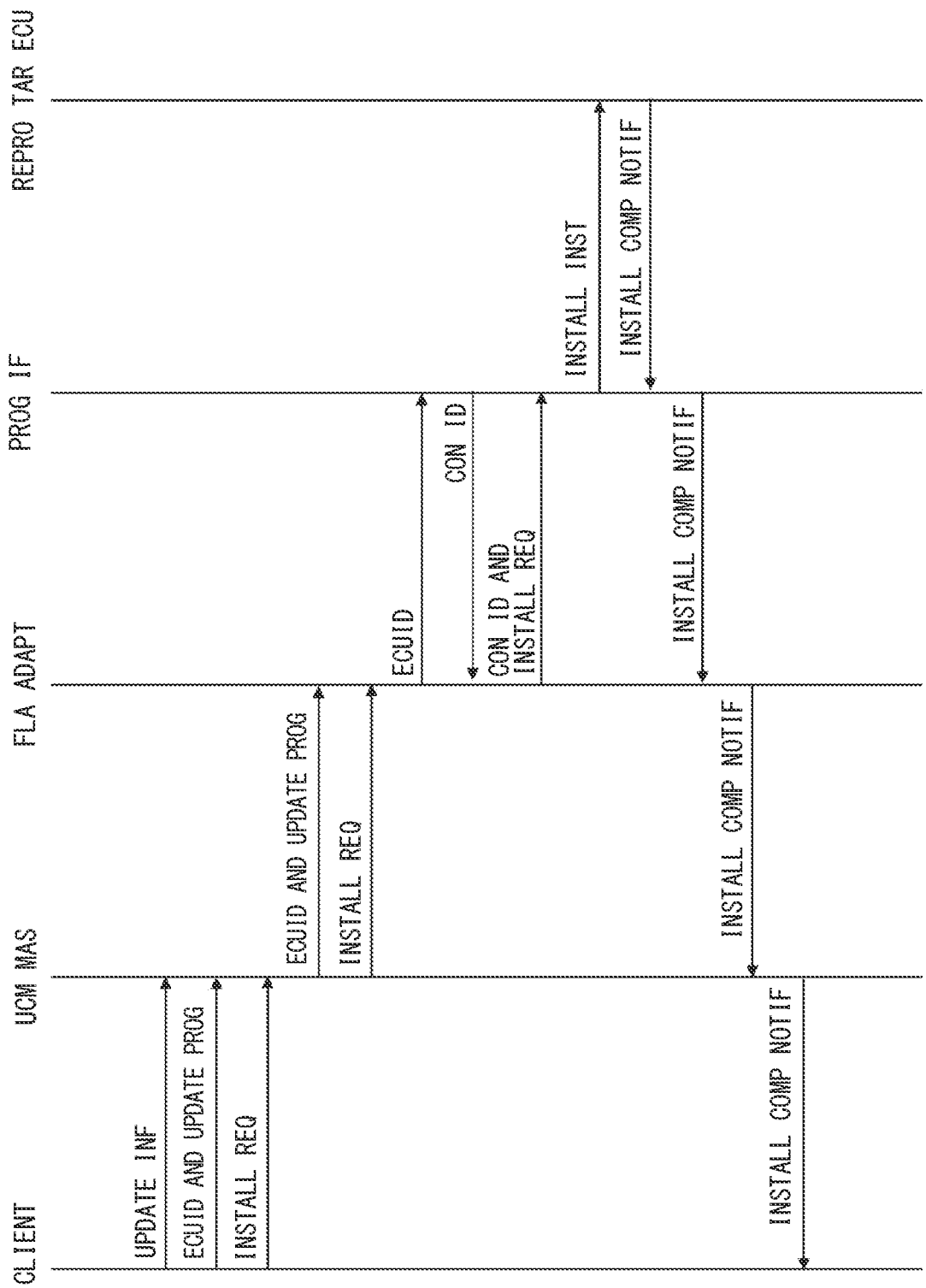
FIG. 15 is a diagram showing the flow of the process during installation.

As described above, the control unit 5 performs the flow of processing shown in FIG. 15 at the time of installation.

(4) Activation Process (See FIGS. 16 to 19)

Figure 16:
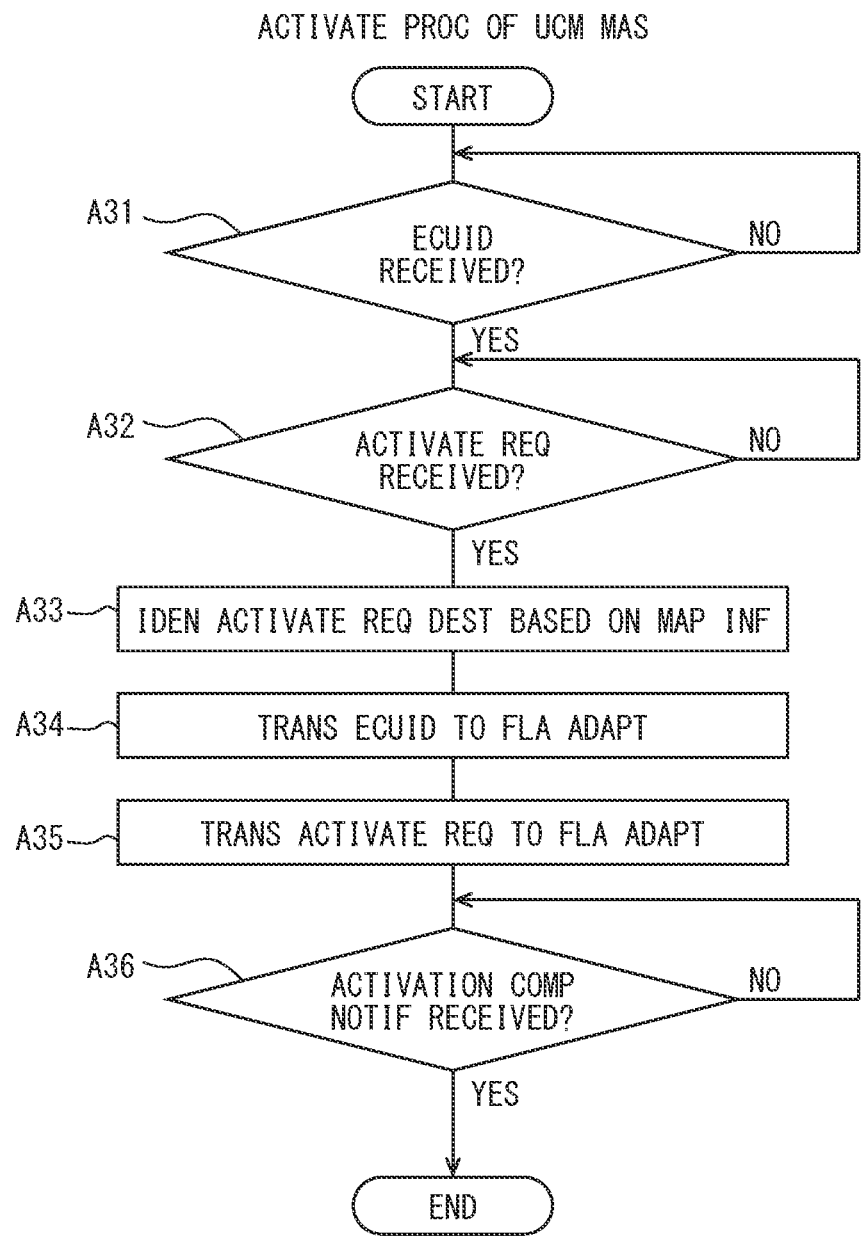
FIG. 16 is a flowchart showing an activation process of the UCM master.

(4-1) Activation Process of a UCM Master 8 (See FIG. 16)

After starting the activation process, the UCM master 8 waits for reception of the ECUID of the reprogram target ECU from the OTA client 7 (at A31). When the UCM master 8 determines that it has received the ECUID of the reprogram target ECU transmitted from the OTA client 7 ("YES" at A31), the UCM master 8 waits to receive an activation request from the OTA client 7 (at A32). When the UCM master 8 determines that it has received the activation request transmitted from the OTA client 7 ("YES" at A32), the UCM master 8 identifies the activation request destination based on the mapping information (at A33).

The UCM master 8 transmits the ECUID of the reprogram target ECU to the flashing adapter 9 (at A34), transmits an activation request to the flashing adapter 9 (at A35), and waits for reception of activation completion notification from the flashing adapter 9 (at A36). When the UCM master 8 determines that it has received the activation completion notification transmitted from the flashing adapter 9 ("YES" at A36), the UCM master 8 terminates the activation process. In addition, the UCM master 8 further transmits an activation request to the UCM 11 in step A35 when an AP-compliant ECU is included in the reprogram target ECUs.

Figure 17:
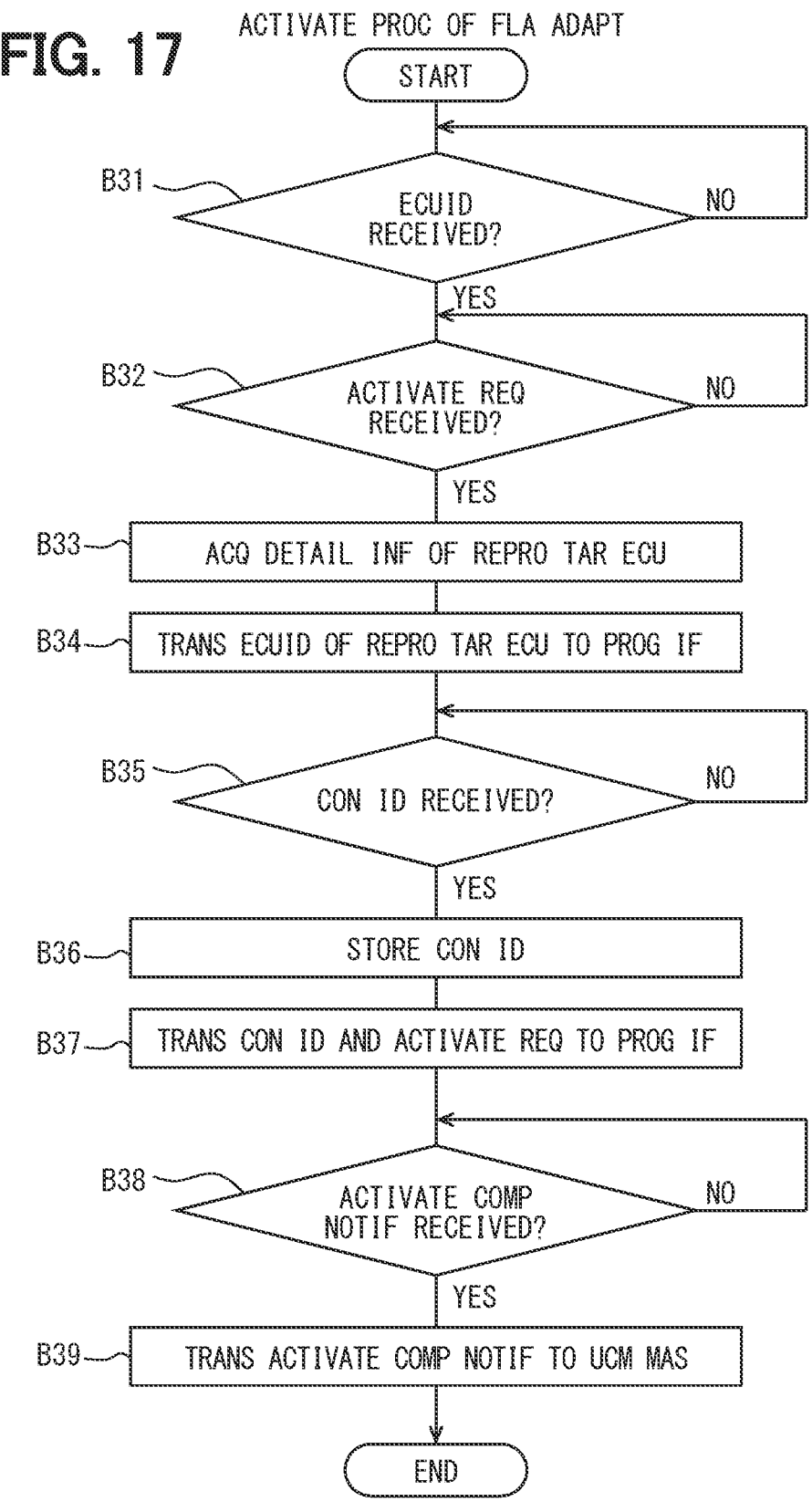
FIG. 17 is a flowchart showing an activation process of the flashing adapter.

(4-2) Activation Process of a Flashing Adapter 9 (See FIG. 17)

After starting the activation process, the flashing adapter 9 waits for reception of the ECU ID of the reprogram target ECU from the UCM master 8 (at B31). When the flashing adapter 9 determines that it has received the ECUID of the reprogram target ECU transmitted from the UCM master 8 ("YES" at B31), the flashing adapter 9 waits to receive an activation request from the UCM master 8 (at B32). When the flashing adapter 9 determines that it has received the activation request transmitted from the UCM master 8 ("YES" at B32), the flashing adapter 9 refers to the detailed information reference table based on the ECUID of the reprogram target ECU, and obtains the detailed information of the reprogram target ECU (at B33, corresponding to the detailed information reference procedure).

When the flashing adapter 9 acquires the detailed information of the reprogram target ECU, it performs the connection process described above. The flashing adapter 9 transmits the ECUID of the ECU as the reprogram target to the programming IF 10 (at B34), and waits for reception of the connection ID from the programming IF 10 (at B35). When the flashing adapter 9 determines that it has received the connection ID transmitted from the programming IF 10 ("YES" at B35, corresponding to the device identification information reception procedure), the flashing adapter 9 stores the received connection ID (at B36). Here, when the flashing adapter 9 already holds the connection ID, steps B33 to B36 may be skipped.

The flashing adapter 9 transmits the connection ID and the activation request to the programming IF 10 (at B37, corresponding to a process request transmission procedure), and waits for reception of activation completion notification from the programming IF 10 (at B38). When the flashing adapter 9 determines that it has received the activation completion notification transmitted from the programming IF 10 ("YES" at B38), the flashing adapter 9 transmits the received activation completion notification to the UCM master 8 (at B39), and terminates the activation process.

Figure 18:
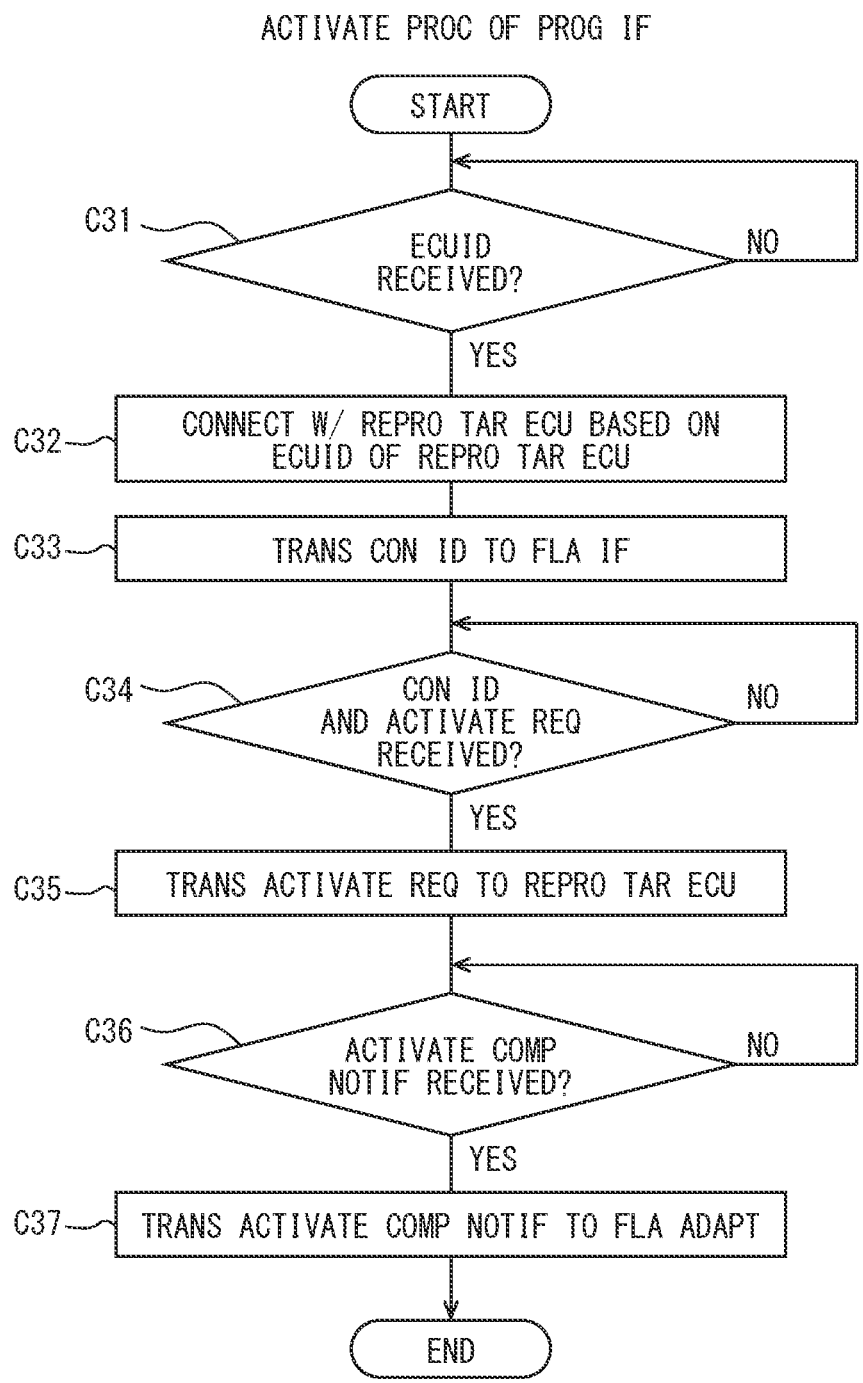
FIG. 18 is a flowchart showing an activation process of the programming IF.
Figure 19:
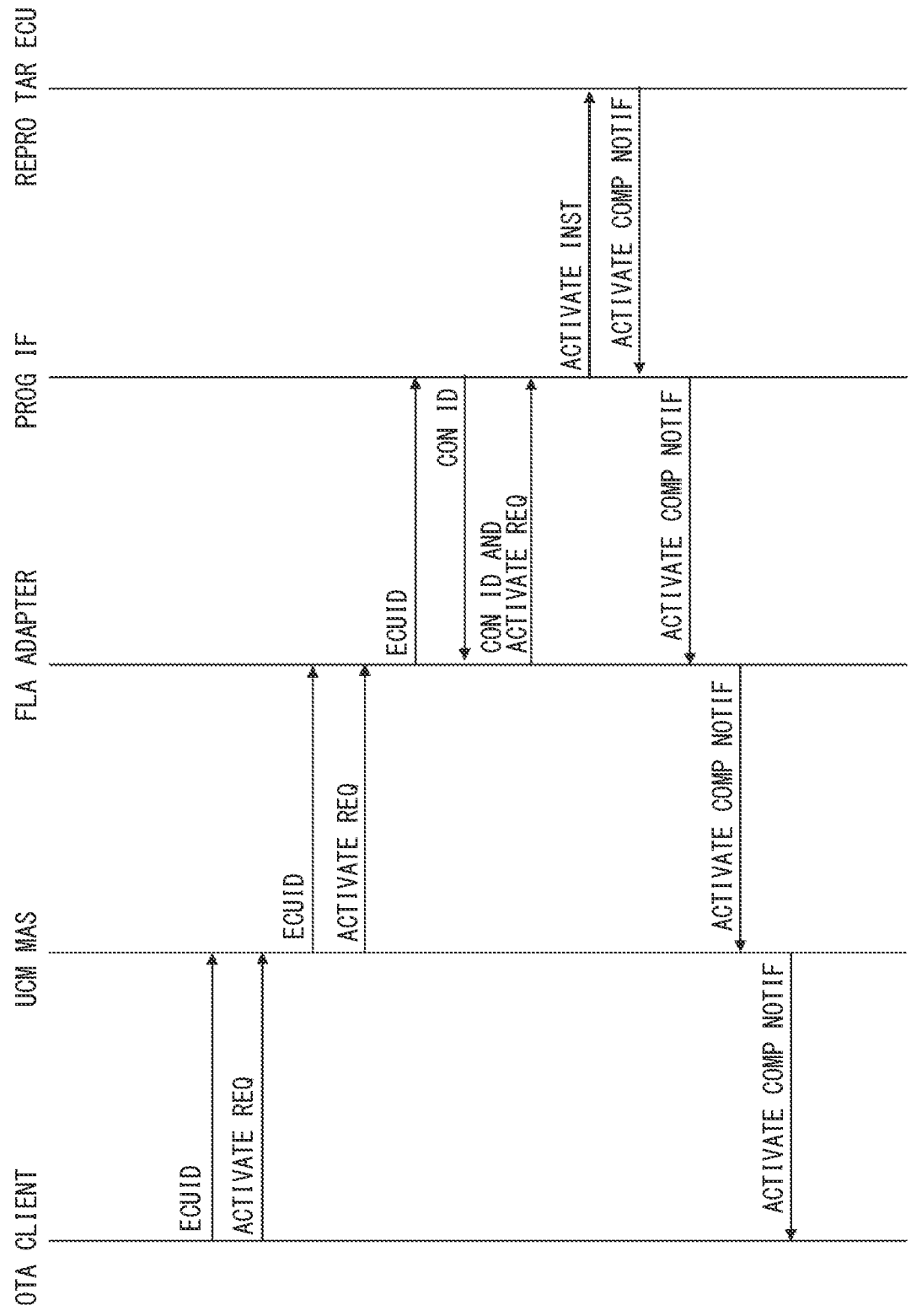
FIG. 19 is a diagram showing the flow of the process during activation.

(4-3) Activation Process of a Programming IF 10 (See FIG. 18)

When the programming IF 10 starts the activation process, the programming IF 10 performs the connection process described above. That is, the programming IF 10 waits for reception of the ECUID of the reprogram target ECU from the flashing adapter 9 (at C31). When the programming interface 10 determines that it has received the ECUID of the ECU as the reprogram target transmitted from the flashing adapter 9 ("YES" at C31), the programming IF 10 identifies the ECU as the reprogram target and the connection destination based on the received ECUID of the ECU as the reprogram target, and connects to the ECU as the reprogram target identified as the connection destination (at C32).

The programming IF 10 transmits the connection ID to the flashing adapter 9 (at C33), and waits for reception of the connection ID and the activation request from the flashing adapter 9 (at C34). When the programming IF 10 determines that it has received the connection ID and the activation request transmitted from the flashing adapter 9 ("YES" at C34), the programming IF 10 transmits an activation instruction to the reprogram target ECU based on the ECUID corresponding to the received connection ID (at C35), and waits for reception of activation completion notification from the reprogram target ECU (at C36).

In this case, when the reprogram target ECU receives the activation instruction transmitted from the programming IF 10, the reprogram target ECU activates the update program, and upon completing the activation of the update program, transmits an activation completion notification to the programming IF 10. When the programming IF 10 determines that it has received the activation completion notification transmitted from the reprogram target ECU ("YES" at C36), the programming IF 10 transmits the received activation completion notification to the flashing adapter 9 (at C37), and terminates the activation process. As described above, the control unit 5 performs the flow of processing shown in FIG. 19 at the time of activation.

Figure 20:
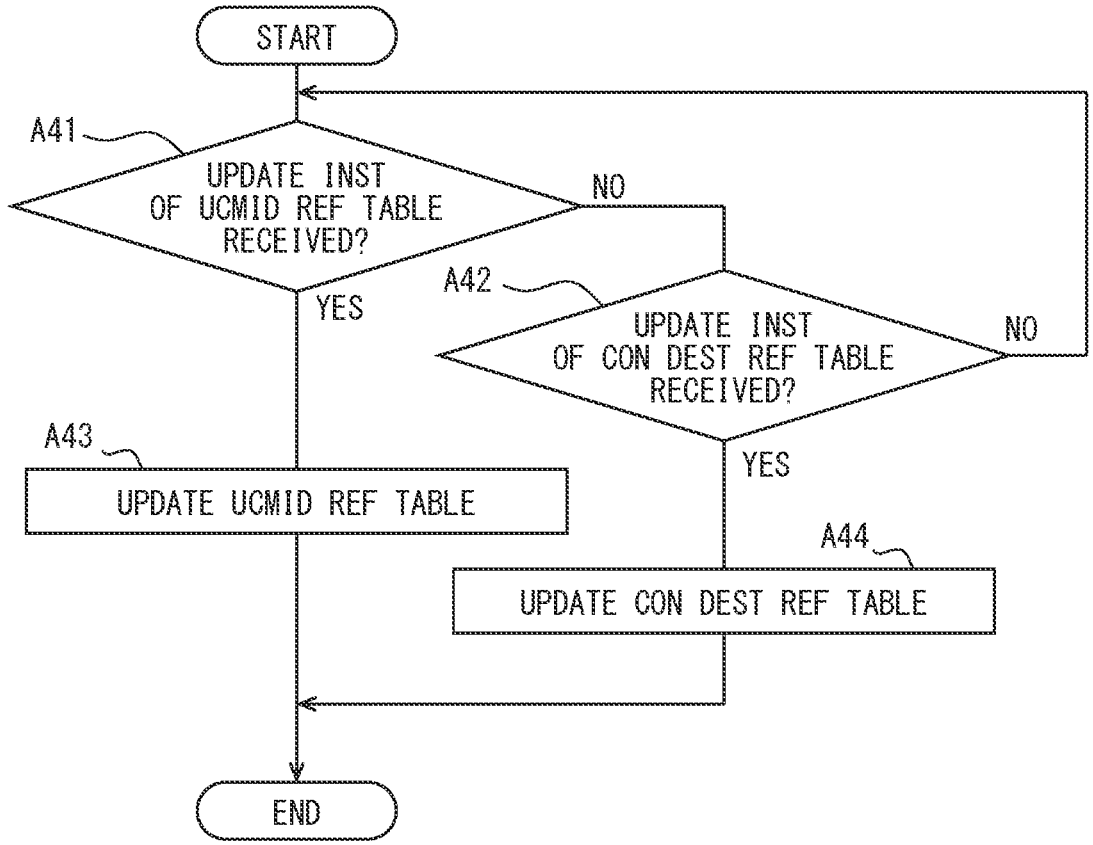
FIG. 20 is a flowchart showing a table update process of the UCM master.
Figure 21:
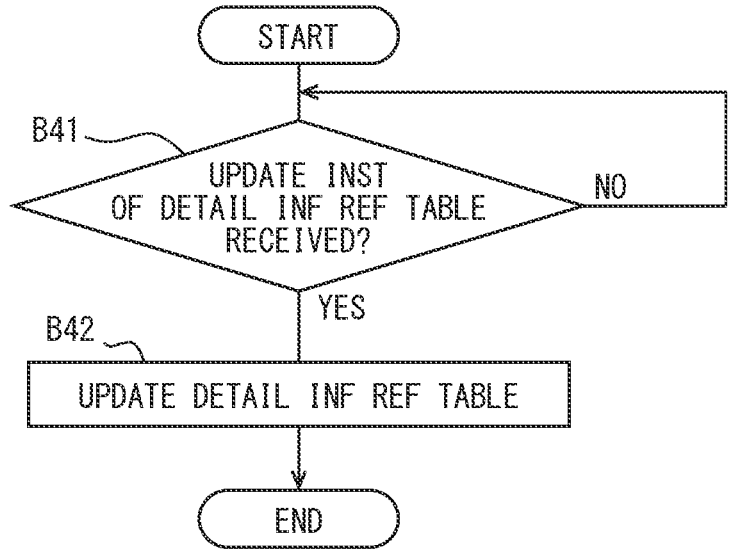
FIG. 21 is a flowchart showing a table update process of the flashing adapter.

(5) Table Update Process (See FIGS. 20 to 21)

(5-1) Table Update Process of a UCM Master 8 (See FIG. 20)

After starting the table update process, the UCM master 8 waits to receive an instruction to update the UCMID reference table (at A41) and waits to receive an instruction to update the connection destination reference table (at A42). When the UCM master 8 determines that it has received the instruction to update the UCMID reference table ("YES" at A41), the UCM master 8 updates the UCMID reference table (at A43) and terminates the table update process. When the UCM master 8 determines that it has received the connection destination reference table update instruction ("YES" at A42), the UCM master 8 updates the connection destination reference table (at A44) and ends the table update process.

(5-2) Table Update Process of a Flashing Adapter 9 (See FIG. 21)

After starting the table update process, the flashing adapter 9 waits for reception of an update instruction for the detailed information reference table (at B41). When the flashing adapter 9 determines that it has received an instruction to update the detailed information reference table ("YES" at B41), the flashing adapter 9 updates the detailed information reference table (at B42) and terminates the table update process.

As described above, according to the present embodiment, the following actions and effects can be achieved.

When the master ECU 1 holds the detailed information reference table, and receives the ECUID from the UCM master 8 that can identify a CP-compliant ECU as a reprogram target, the master ECU 1 refers to the detailed information and transmits a processing request to the CP-compliant ECU via the programming IF 10 based on the detailed information. As a result, by appropriately transmitting the processing request to the CP-compliant ECU as the reprogram target, the reprogramming can be performed appropriately.

The master ECU 1 transmits a version information acquisition request as a processing request. The software version information can be appropriately obtained from the CP-compliant ECU as the reprogram target. The master ECU 1 transmits a request to install an update program as a processing request. It is possible to properly install the update program in the reprogram target ECU conforming to CP. The master ECU 1 transmits an update program activation request as a processing request. It is possible to properly activate the update program in the reprogram target ECU conforming to CP.

While the present disclosure has been described based on the embodiment, the present disclosure is not limited to the embodiment or structure described herein. The present disclosure includes various modification examples or variations within the scope of equivalents. Additionally, various combinations and configurations, as well as other combinations and configurations including more, less, or only a single element, are within the scope and spirit of the present disclosure.

The control unit, which may also be referred to as a controller, and a method thereof described in the present disclosure in the above embodiments may be implemented by one or more special-purpose computers. Such computers may be created (i) by configuring (a) a memory and a processor programmed to execute one or more particular functions embodied in computer programs, or (ii) by configuring (b) a processor provided by one or more special purpose hardware logic circuits, or (iii) by configuring a combination of (a) a memory and a processor programmed to execute one or more particular functions embodied in computer programs and (b) a processor provided by one or more special purpose hardware logic circuits. The computer program may be stored, as an instruction executed by a computer, in a computer-readable non-transitory tangible storage medium. Alternatively, the control unit and the method thereof described in the present disclosure may be implemented by a dedicated computer provided by configuring a processor with one or more dedicated hardware logic circuits. Alternatively, the control unit and the method thereof described in the present disclosure may be implemented by one or more dedicated computers configured by a combination of a processor and a memory programmed to execute one or more functions and a processor configured by one or more hardware logic circuits. The computer program may be stored in a computer-readable non-transitional tangible recording medium as an instruction to be executed by the computer.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as B1. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An electronic control apparatus comprising:
a UCM master configured to transmit device identification information, which identifies an electronic control device to be a software update target, to a flashing adapter or UCM, wherein the UCM and the UCM master comply with AUTOSAR Adaptive platform;
the flashing adapter, which is configured to receive the device identification information from the UCM master when the electronic control device as the software update target complies with the AUTOSAR Classic platform;
a programming interface (IF) configured to access a vehicle communication interface complying with a predetermined communication standard;
a detailed information holding unit configured to hold detailed information of a connection destination necessary for transmitting a processing request to the electronic control device identified by the device identification information as the software update target, wherein the detailed information includes an IP address, a CAN ID, and a port;
wherein:
the UCM master determines whether the electronic control device as the software update target complies with the AUTOSAR Classic platform; and
when the UCM master determines that the electronic control device complies with the AUTOSAR Classic platform:
the UCM master transmits the device identification information to the flashing adapter; and
the flashing adapter, upon receiving the device identification information from the UCM master, refers to the detailed information held by the detailed information holding unit transmits the processing request to the electronic control device through the programming IF based on the detailed information.

2. The electronic control apparatus according to claim 1, wherein:
the UCM master transmits, as the processing request, a processing request regarding acquisition of version information of software stored in the electronic control device as the reprogram target.

3. The electronic control apparatus according to claim 1, wherein:
the UCM master transmits, as the processing request, a processing request regarding installation of an update program.

4. The electronic control apparatus according to claim 1, wherein:
the UCM master transmits, as the processing request, a processing request regarding activation of an update program.

5. The electronic control apparatus according to claim 1, wherein:
the detailed information holding unit holds information including an IP address, a CANID, and a port as the detailed information.

6. The electronic control apparatus according to claim 1, further comprising:
one or more processors, wherein:
the one or more processors provide at least: the UCM master; the detailed information holding unit; and the flashing adapter.

7. A reprogram execution method performed in an electronic control apparatus comprising:
receiving, with a flashing adapter or UCM, device identification information transmitted from a UCM master that identifies an electronic control device to be a software update target, wherein the UCM and the UCM master comply with AUTOSAR Adaptive platform;
receiving, with the flashing adapter, the device identification information from the UCM master when the electronic control device as the software update target complies with the AUTOSAR Classic platform;
accessing, with a programming interface (IF), a vehicle communication interface complying with a predetermined communication standard;
holding, with a detailed information holding unit, detailed information of a connection destination necessary for transmitting a processing request to the electronic control device identified by the device identification information as the software update target, wherein the detailed information includes an IP address, a CAN ID, and a port;
wherein:
the UCM master determines whether the electronic control device as the software update target complies with the AUTOSAR Classic platform; and
when the UCM master determines that the electronic control device complies with the AUTOSAR Classic platform, the method further comprises:
transmitting the device identification information to the flashing adapter; and
upon receiving the device identification information from the master, referring to the detailed information held by the detailed information holding unit and transmitting, with the flashing adapter, the processing request to the electronic control device through the programming IF based on the detailed information.

8. A non-transitory tangible computer readable storage medium comprising instructions being executed by a control unit of an electronic control apparatus, the instructions comprising:
receiving, with a flashing adapter or UCM, device identification information transmitted from a UCM master that identifies an electronic control device to be a software update target, wherein the UCM and the UCM master comply with AUTOSAR Adaptive platform;
receiving, with the flashing adapter, the device identification information from the UCM master when the electronic control device as the software update target complies with the AUTOSAR Classic platform;
accessing, with a programming interface (IF), a vehicle communication interface complying with a predetermined communication standard;
holding, with a detailed information holding unit, detailed information of a connection destination necessary for transmitting a processing request to the electronic control device identified by the device identification information as the software update target, wherein the detailed information includes an IP address, a CAN ID, and a port;
wherein:
the UCM master determines whether the electronic control device as the software update target complies with the AUTOSAR Classic platform; and when the UCM master determines that the electronic control device complies with the AUTOSAR Classic platform, the method further comprises:
transmitting the device identification information to the flashing adapter; and upon receiving the device identification information from the master, referring to the detailed information held by the detailed information holding unit and transmitting, with the flashing adapter, the processing request to the electronic control device through the programming IF based on the detailed information.

* * * * *